(12) United States Patent
Fogelstrom

(10) Patent No.: US 7,216,552 B2
(45) Date of Patent: May 15, 2007

(54) PROGNOSTIC AND DIAGNOSTIC SYSTEM FOR AIR BRAKES

(75) Inventor: Kenneth A. Fogelstrom, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 149 days.

(21) Appl. No.: 11/211,392

(22) Filed: Aug. 25, 2005

(65) Prior Publication Data

US 2007/0044551 A1    Mar. 1, 2007

(51) Int. Cl.
*G01L 3/00* (2006.01)
(52) U.S. Cl. .................................. 73/862.326
(58) Field of Classification Search ............... 73/121, 73/862.326; 701/129, 1; 417/290, 12, 39
See application file for complete search history.

(56) References Cited

U.S. PATENT DOCUMENTS

| | | | |
|---|---|---|---|
| 5,572,187 A | | 11/1996 | Williford |
| 5,979,999 A | * | 11/1999 | Poertzgen et al. ........ 303/116.1 |
| 7,089,815 B2 | * | 8/2006 | Fogelstrom ................. 73/865.9 |
| 2005/0220634 A1 | * | 10/2005 | Fogelstrom .................. 417/290 |

OTHER PUBLICATIONS

U.S. Appl. No. 10/813,939, filed Mar. 31, 2004, Fogelstrom.
U.S. Appl. No. 10/862,836, filed Jun. 7, 2004, Fogelstrom.

* cited by examiner

*Primary Examiner*—Jewel Thompson
(74) *Attorney, Agent, or Firm*—Jeffrey P. Calfa; Gerald W. Askew; Susan L. Lukasik

(57) ABSTRACT

Vehicles equipped with air brake systems and onboard vehicle management computers are programmed to develop both a prognosis and diagnosis of problems in the supporting, compressed air supply system from monitoring compressed air supply tank pressure. Variance of measured pressure from established norms correlated with the frequency and duration of charging cycles as well as brake pedal position provides indication of the likely source of present and future problems.

7 Claims, 11 Drawing Sheets

FIG. 4

| Fault Matrix | | | | | | | | | | | |
|---|---|---|---|---|---|---|---|---|---|---|---|
| Air Tank Leakage Algorithm Development | | | | | | | | | | | |
| Purpose: Identify potential failure modes that can be identified by air tank prognostics and diagnostics. | | | | | | | | | | | |
| | a | b | c | d | e | f | g | h | i | | |
| Indicators | Cut-in pres too low | Cut-in pres too high | Cut-out pres too low | Cut-out pres too high | Never hits max pres | Charge time rises (given RPM) | Charge time drops (given RPM) | Pedal up leak rate rising | Pedal dn leak rate rising | Freq. rises | Diagnostic |
| Compressor problem | ● | | | | □ | | | | | | f NOT i = compressor problem |
| Governor problem | | ● | ● | ● | | | | | | | a OR b OR c OR d = governor problem |
| Belt slipping | | | | | ● | ● | | | | | f NOT (e AND h AND i) = belts |
| Leaks AHEAD of tanks | | | | | □ | ● | | | ● | | i AND (e OR f) = leak ahead of tank |
| Leaks AT tanks | | | | | | ● | | ● | ● | | i AND f AND (h OR i) = leak at tank |
| Leaks AFTER tanks | | | | | | | | ● | ● | ● | i AND [i NOT (f AND h)] = leak after tank |
| Water in tanks | | | | | | | ▨ | | | | g |
| Un-metered air use | | | | | | | | | | ● | j NOT f |

☑ Must verify
☐ Yes, but don't care
● Yes

PROGNOSTIC AND DIAGNOSTIC SYSTEM FOR AIR BRAKES

BACKGROUND OF THE INVENTION

1. Technical Field

The invention relates to air brake systems for motor vehicles and more particularly to a air brake system condition monitoring system providing prognostic and diagnostic functionality.

2. Description of the Problem

Motor vehicle air brake systems rely on air compressors to supply pressurized air to air tanks which in turn supply air, under pressure, to the brake system. The tanks also typically supply air for brakes on trailers pulled by the tractor and may be used to supply air to other vehicle and trailer systems such as air suspension systems. Fault free operation of the air compressor, storage and distribution system are required for reliable and predictable brake operation.

Air brake systems can develop leaks upstream from, at and downstream from the tanks. The system air compressor can deteriorate over time, causing increases in tank charging times. Water can infiltrate storage tanks. All of these factors can affect reliability and effectiveness of the brake system.

To avoid unexpected failure of the air brake system, periodic verification that the compressor, pressurized air storage tanks and air brake lines are in good order is essential. However, manual inspection of these items is time consuming. It has been estimated that 80% of mechanics' time is spent on problem diagnosis. Much potential exists for time saving by use of on board diagnostic systems which can narrow the scope of potential problems to investigate and can provide a prognosis of developing problems.

Manual and visual inspections of air brake systems are done during daily pre-trip inspections. If tank leakage rates or tank charge times are higher that Department of Transportation established maximums, repair is required. Since pre-trip inspections may be unevenly performed, and since precision in measurement suffers due to low resolution of visual gauges, the reliability of such inspections is questionable. In addition, the ability to provide prognoses for developing problems where the multiple indicia must be correlated, is highly problematical. This can force maintenance to be based on mileage rather than need.

Pressure in an air brake system is typically measured only for the compressed air storage tanks. The air compressor on a truck is under the control of a governor which controls compressor operation in response to measured tank pressure. The point where the governor engages compressor operation is called the cut-in pressure. The governor responds to pressure in the system reaching an upper limit to cause the air compressor to discontinue supplying pressurized air. This point termed the cut-out pressure. A monitoring, prognostic and diagnostic system which requires pressure data only from a tank pressure sensor would be advantageous.

SUMMARY OF THE INVENTION

According to the invention there is provided a system for estimating the condition of a compressed air supply system installed on a motor vehicle. The compressed air supply system has a prime mover, a compressor coupled to be energized by the prime mover, a governor controlling engagement of the prime mover to the compressor, an air line from the compressor, a storage tank coupled to receive compressed air through the air line and an outlet air line from the storage tank for connection to a vehicle subsystem requiring pressurized air. The improvement is characterized in that an air pressure sensor, provided for monitoring storage tank pressure, is connected to provide measurements of pressure to a body controller, that is a type of on board, general purpose computer. A brake pedal position sensor, which indicates brake pedal up and brake pedal down status, is also connected to the body controller. The body controller includes its own clock signal generator. Stored in memory in the body controller are a cycle interval norm for the compressor, indicating acceptable normal limits for frequency of operation, a duty cycle norm for the compressor, indicating acceptable time limits to in which to charge the storage tank, a maximum air pressure norm for the storage tank and a minimum air pressure norm for the storage tank. The body controller/computer uses the norms, the air pressure measurement, the clock and the status of the brake pedal to correlate variance in measurements from the pre-established norms with at least a first potential or actual fault condition.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a matrix illustrating fault detection of isolation of diagnosis of faults.

DETAILED DESCRIPTION OF THE INVENTION

Figure 1:
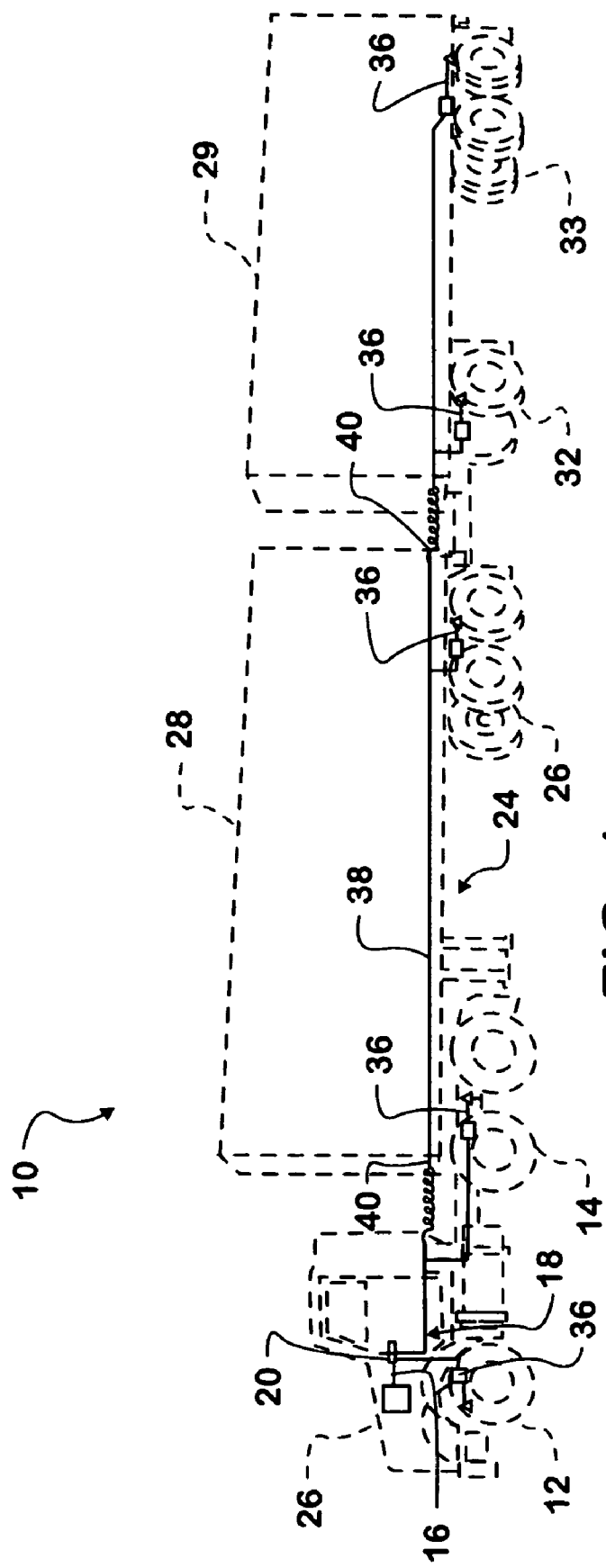
FIG. 1 is a side view of a possible truck/tandem trailer combination illustrating installation of an air brake system with which the invention may be used.

Referring now to the figures and in particular to FIG. 1, a tandem trailer/tractor combination 10 equipped with air brake system 24 is illustrated. Trailer/tractor combination 10 is a typical environment for the practice of the present invention. Tandem trailer/tractor combination 10 includes a tractor 26 and two trailers, 28 and 29, respectively. Tractor 26 and trailers 28,29 are supported on wheels 12, 14, 26, 32 and 33, the rotation of which may be slowed or stopped using air pressure actuated brakes 36. Air brake system 24 may be considered as including an air pressurization and storage subsystem including a compressor 16, storage tanks 18 and air lines 20, 40 and 38. The mechanical details of air brake system 24 are conventional.

Figure 2:
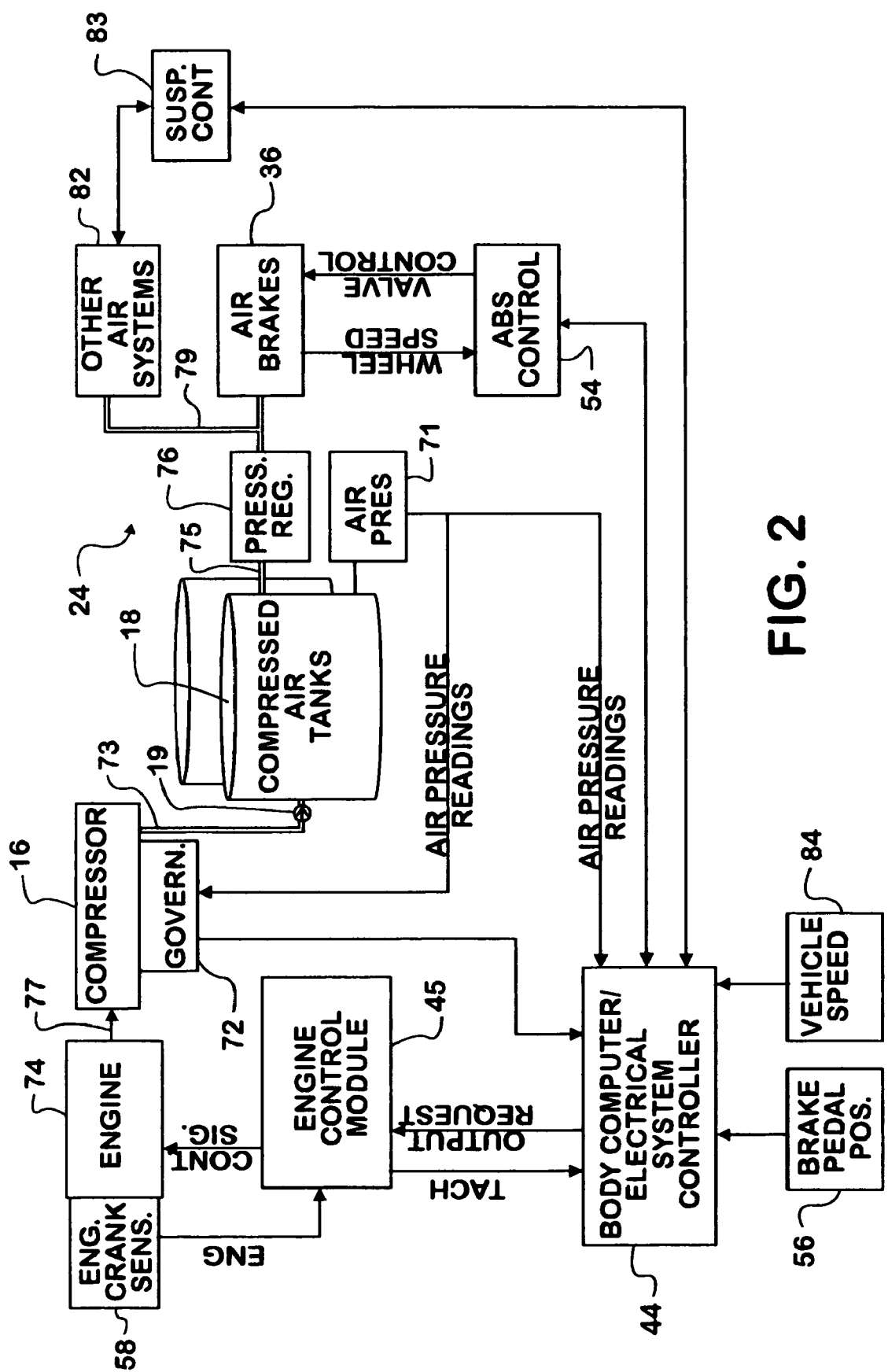
FIG. 2 is a block diagram of an air brake system with associated control electronics.

FIG. 2 is a block diagram which illustrates controllers and sensors of a conventional air brake system 24 used in implementing a preferred embodiment of the invention. Selected components of a conventional air system such as an air dryer are not shown, since their presence does not affect operation of the invention. Nor are dry tanks distinguished from wet tanks. An air brake system works on compressed air and accordingly the vehicle engine 74 is harnessed as a power source for driving air compressor 16. Vehicle engine 74 is mechanically linked by a belt 77 to drive compressor 16. Compressor 16 in turn supplies air along an air line 73 to a check valve 19 to compressed air storage tanks 18. The system is designed to maintain air pressure in a range of 100 to 125 psi. Air pressure is maintained at this level by placing compressor 16 under the control of a governor 72. Governor 72 is in turn responsive to measurement of air pressure in compressed air storage tanks 18. Air is supplied from the compressor to storage tanks 18 via an air line 73. Air in turn is supplied to pressurized air utilizing systems via an outlet air line 75 from storage tanks 18 to a pressure regulator 76. A downstream air line 79 connects the pressure regulator to air utilizing systems.

Air pressure readings are provided by an air pressure sensor 71 which communicates with one of compressed air tanks 18, usually the dry tank. Air pressure signals developed by air pressure sensor 71 are passed to body computer 44 and to governor 72. In contemporary motor vehicle control architectures, a controller area network ("CAN", not shown) is used to distribute messages from sensors and controllers around the vehicle to other controllers. In some cases a sensors are directly connected to a controller. The illustrated direct routing of the air pressure signals from an air pressure sensor 71 to governor 72 and body computer 44 is not intended as an explicit or particular underlying hard-wired architecture, but as an example. Pressure readings from air pressure sensor 71 may be communicated to the engine control module 45 and from that node placed on a CAN bus for receipt by the body computer 44. The diagram is intended only to illustrate eventual users of the air pressure readings. Similarly, indication from governor 72 as to whether compressor 16 is running is directly or indirectly communicated to body computer 44.

Air pressure sensor 71 is typically in communication with a dry tank. Where two dry tanks are used either one may be selected. The selected tank becomes the base for all measurements. Body computer 44 receives an engine speed signal from engine control module 45. Engine crankshaft position sensor 58 operates as a tachometer in conjunction with an internal clock on board the engine control module 45 to provide engine speed. Engine speed is required since compressor output varies as a function of engine speed. Were an electric motor the motive source for compressor 16 than engine speed would not be needed. Brake pedal position sensor 56 provides indication as to whether the brakes are in use or not (referred to as pedal down and pedal up, respectively). Refinement of the estimated use of air to actuate the brakes may be provided to the body computer 44 by an anti-lock brake system controller 54. Vehicle speed 84 is supplied from a transmission controller (not shown) or the engine control module 45, which generates the signal from the drive shaft tachometer (not shown). ABS controller 54 may report data relating to air brake 80 operation for the use of body computer 44. The possibility of other air using systems present on the vehicle, usually including an air suspension system, is represented by a general block labeled other air systems 82. Operation of air suspension system controller 83 may be reported to body computer 44 allowing enhancement of the algorithm employed in implementing the present invention. As may be seen from the illustration, body computer 44 may request increased engine 74 output through the engine controller 45.

Body computer 44 is a programmable, general purpose computer within internal memory for storing programs. Body computer 44 includes an internal clock which may be used to time various system operations and phenomena.

Figure 3:
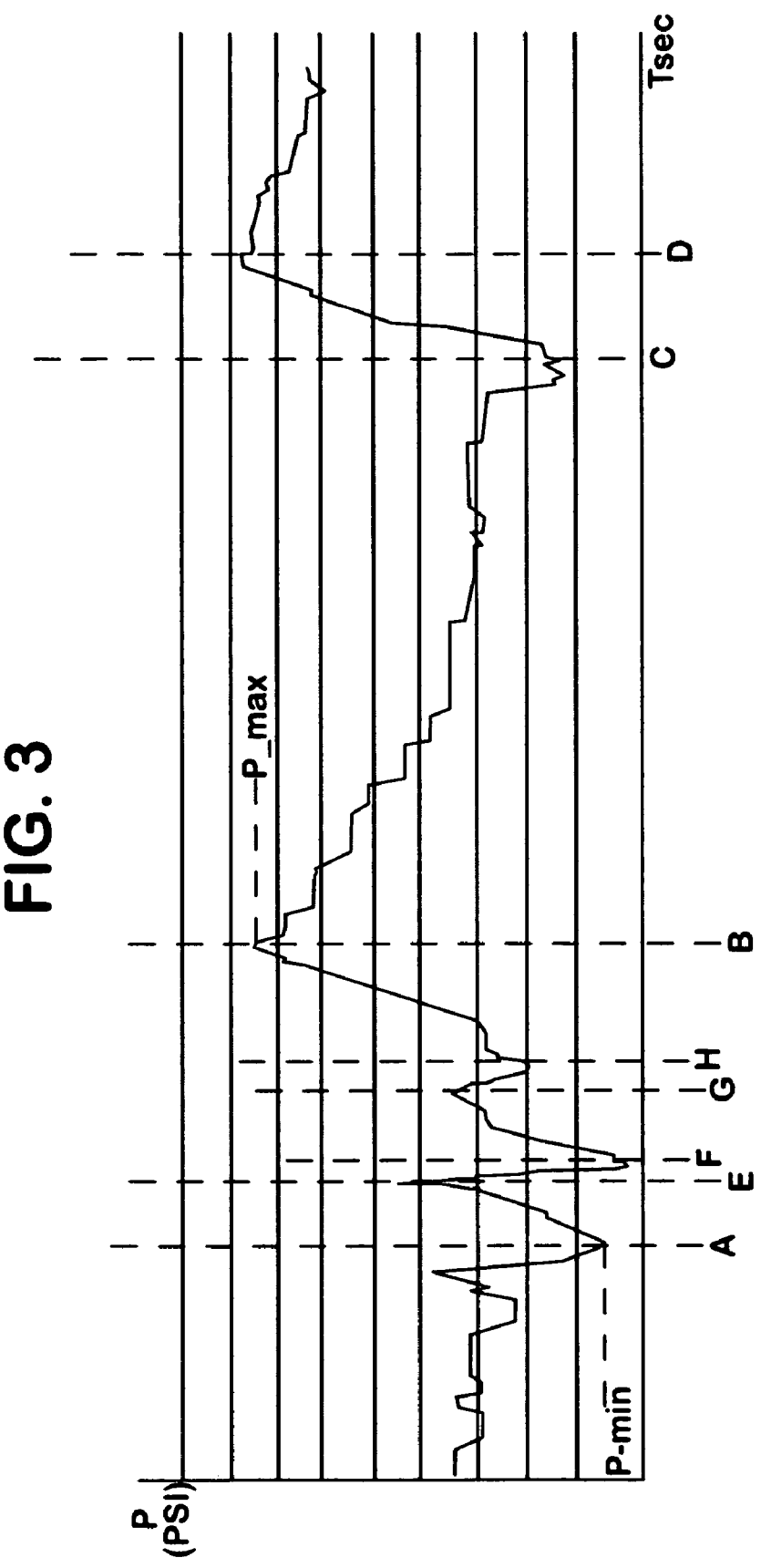
FIG. 3 is a graph of air pressure variation during the duty cycle of the air brake system.

FIG. 3 graphically illustrates typical operational pressure variation for an air brake system. An air pressurization system self-characterization algorithm, disclosed in U.S. patent application Ser. No. 10/813,939, the subject matter of which is incorporated herein by reference, describes determination of normal operating variables for an air system characterized by system pressure variation such as illustrated in the figure. Pressure variation results from periodic cut in and cut out a compressor, variation in charge time due to irregular demands for air and the occurrence of demands for air. P_min and P_max are variables used by programming to determine expected cut_in and cut_out pressures. By "expected" it is meant that certain "averages" are developed from past measurements, which may be weighted as described below. Two complete recovery or charge cycles (A to B and C to D) and one complete cycle of exhaustion (B to C) are represented. Points A, B, C and D may be characterized as major deflection points. Points E, F, G and H are minor deflection points resulting from changes in the demand for air, and not necessarily cut-in or cut-out of the compressor. Time to rise excludes periods following negative turning minor deflection points (E and G) until pressure recovers to the level where a negative turning minor deflection point occurred. Norms are generated over periods of time and it is typically departure from these norms which are used to logically trigger indication of a possible or developing problem. Charge times are adjusted to normalize for engine speed, e.g. longer charge times are allowed at low engine speeds.

FIG. 4 depicts matrix 400 with logic table 402 relating observed variations from norms to problem prognosis and diagnosis. Matrix 400 and table 402, which runs down the right hand side of the matrix, provide the basis for execution of a problem identifying program executed by body computer 44. The matrix 400 includes columns categorized by phenomena and rows identifying phenomena with particular problems. Table 402 identifies the precise logic formula used for identifying probable problems. The indicators 403 across the top matrix 400 have the value YES (presence of a dot or open square) or NO (empty field) and are themselves the result of underlying comparisons of measurements against previously established norms. The indicators a-j include: (a) cut-in pressure occurring at too low a pressure; (b) cut-in pressure occurring at too high a pressure; (c) cut-out pressure too low; (d) cut-out pressure too high; (e) pressure readings failing to hit average maximum pressure; (f) increases in charge time above allowed limit (at a given engine rpm); (g) falling charge time (at a given engine rpm); (h) pedal up leak rate rising; (i) pedal down leak rate rising; and (j) charging cycle frequency increasing (i.e. the interval between commencement of charging is decreasing). A particular departure from a norm is taken and a prognosis indicator or diagnosis of a problem based upon the degree of departure from the norm and which other operational variables are concurrently varying from their norms.

The failure modes are indicated down the left hand most column of matrix 400. A compressor problem is indicated by increases in charge time and by no increase in frequency of occurrence of operation. A governor problem is indicated if any of four conditions occur; (1) cut-in pressure is too low; (2) cut-in pressure is too high; (3) cut-out pressure is too low; or (4) cut-out pressure is too high. Belt slipping is associated with increasing charge time and the absence of failure to hit the expected cut-off pressure, P-max. In addition, pedal up and pedal down leak rates will not have changed. A leak ahead of the storage tank is associated with increasing frequency of charge cycles, with either increasing charge times, or with the pressure never reaching the expected cut-off pressure, P_max. Indicators 403 for such changes may be generated by measurements falling out of a normal range, or measurements evidencing a steady change in a particular direction. A leak at or from the storage tank is associated with increases in charging frequency, increasing charge time and at least one of the following, an increase in pedal up leak rate or an increase in the pedal down leak rate. A leak downstream from the tanks is associated with increases in charging frequency and pedal down leak rate increases. However there cannot be an increase in charge time and pedal up leak rate. Water in the storage tanks is indicated by decreases in charge time. Visual verification water infiltration is required. The occurrence of unmetered air use is associated with increases in charging frequency in the absence of changes in charge time. This may be correlated by reports from a controller for the vehicle function using the air supply, or, more commonly, by the occurrence of minor deflection points in pressure readings.

Figure 5A:
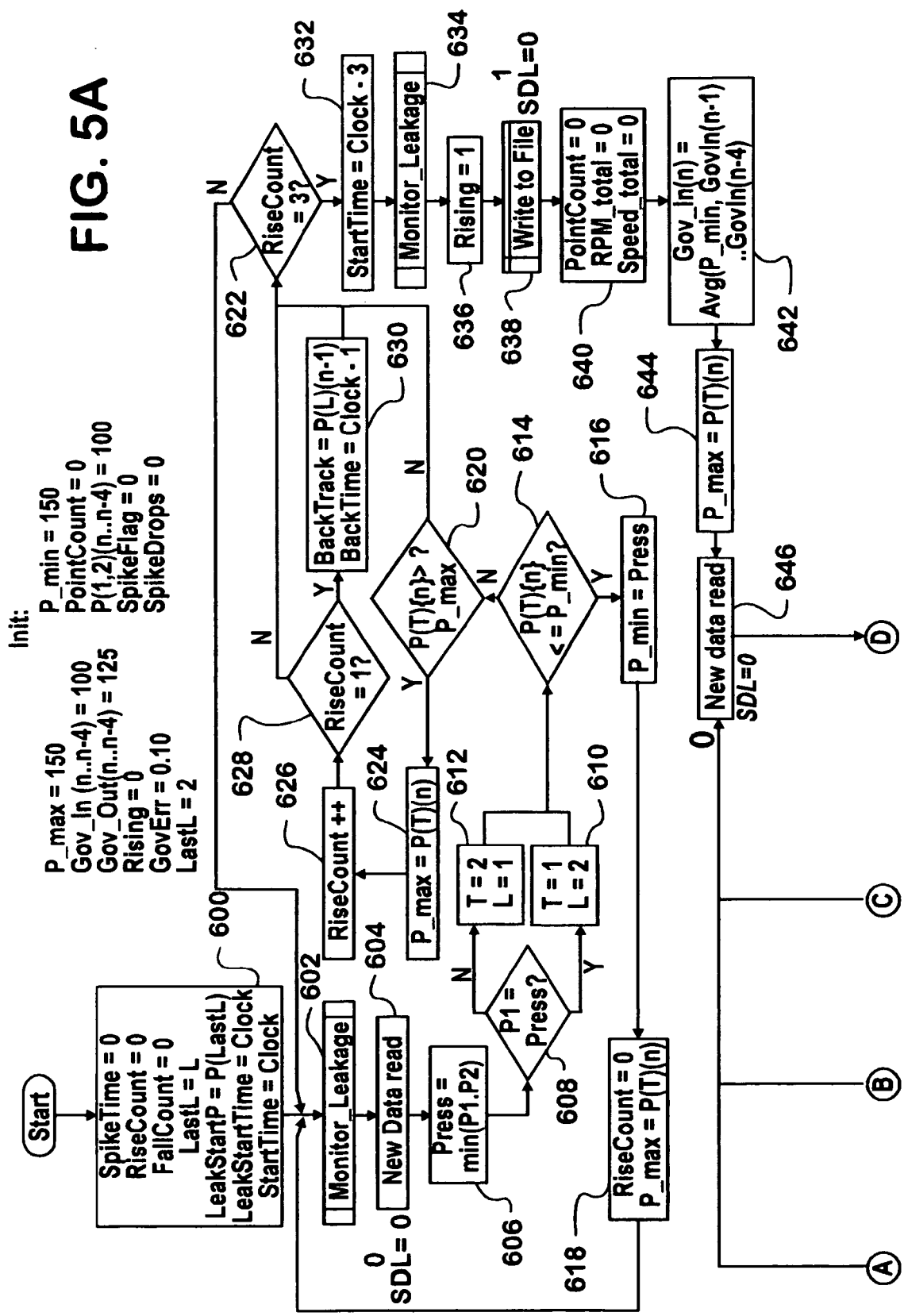
FIGS. 5–9 are flow charts illustrating generation of norms for use in fault detection.
Figure 5B:
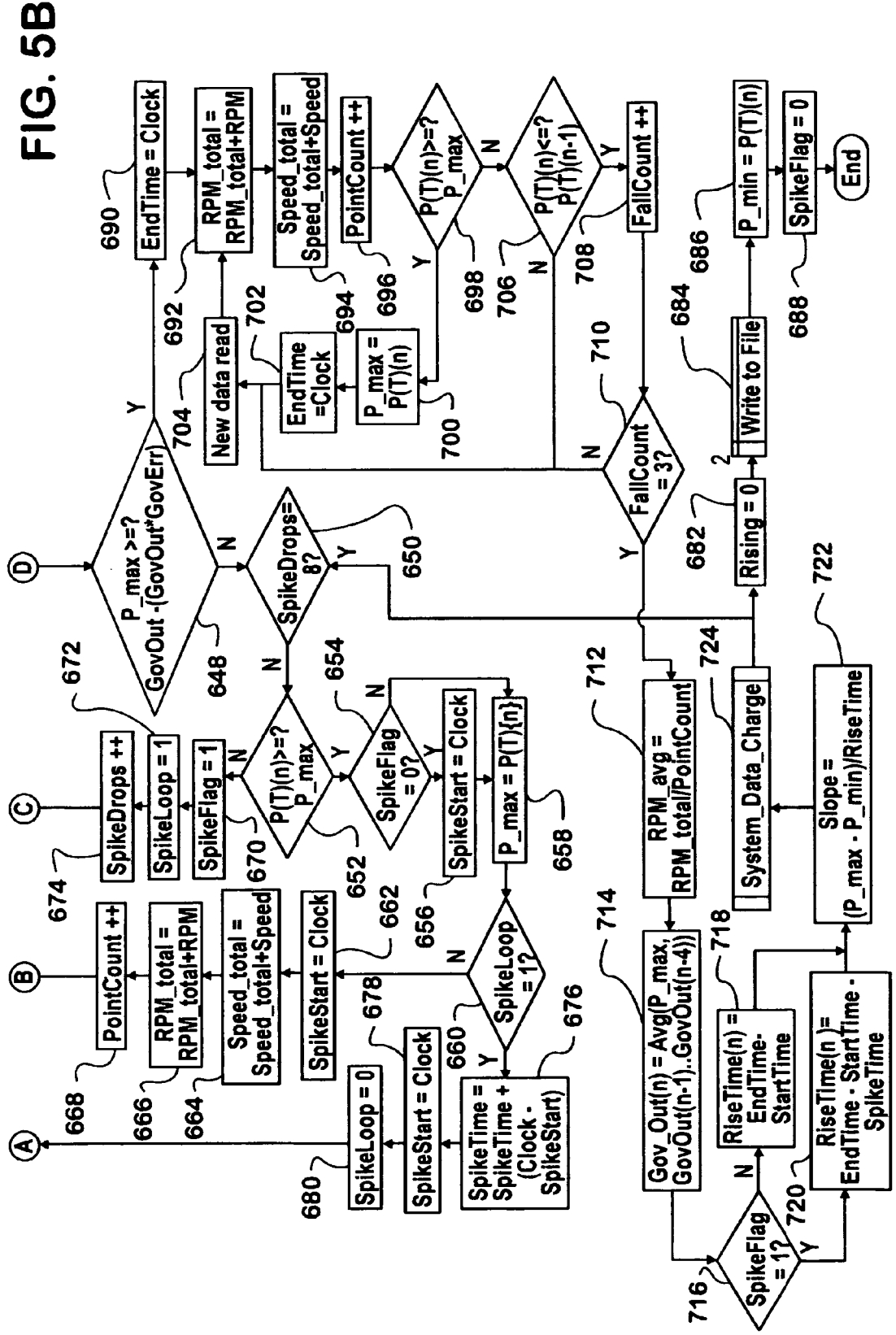

Norms are generated to enable making the comparisons which feed the fault analysis. Referring now to FIG. 5 a flow chart illustrates program 96 which is executed on electrical system controller 44 for determining and updating governor cut-in and governor cut-out points and, more particularly, for generating values for the norms used for comparison purposes. Throughout the following discussion the term "n" relates to a counter which is incremented with each cycle through the routines. Initially it is assumed that the operating characteristics for a vehicle air pressurization system are unknown. In other embodiments the characteristics may be supplied exogenously. This allows embodiments of the invention to be installed on vehicles with different compressor systems and with a minimum of programming adaptation. Initial program installation includes definition of a list of variables (Init), which includes proxy values for governor cut-in and cut-out pressures. The "Init" variables are set once on initial execution of program 96 on body computer 44 and perhaps reset after maintenance work on the air compressor system. The program thereafter use values for the variables developed by the program. Other variables are initialized every time the program is called as indicated at Step 600. Determination of expected governor cut-in and cut-out pressure are reflected in variable stacks [Gov_In(n, . . . , n–4); Gov_Out(n, . . . , n–4)]. Governor cut-in and cut-out norms are determined from averages, in some cases averages of the current measurement and four most recent measurements or on averages of averages. This will be developed below. The Cut-in norm is expected to occur at about 100 psi and so all five values in the stack are initially set to 100. Cut-out should occur at about 125 psi and the five norms in the stack are initially set to 125. Two variables, P_max and P_min, are provided which will indicate the end and start points, respectively, of a period of increasing pressure, associated with system charging, during which a determination of the rise slope is made. Both variables are initially given values far higher than should ever appear, here 150. New values will, upon a successful test, be inserted at the top of the stacks Gov_In, Gov_Out. PointCount indicates the current sample count, and is initially 0. Two variable stacks P(1,2){n . . . n–4}=100 provide first in/first out temporary storage of current pressure measurements. Rising and SpikeFlag are flags. Last L is a variable which takes the value 1 or 2 depending upon the outcome of decision step 608 the prior time through the loop (i.e. LastL is set equal to L which is reset each time step 608 is executed, that is LastL is what L was the previous cycle).

GovErr is a error factor. LeakStartTime and StartTime are set to the current system clock. SpikeTime is set to zero and will eventually take values representing the time between two pressure events, generally oppositely turning minor deflection points. The same routines which generate the norms against which measurements are compared supply a tool for making the comparisons themselves.

Step 602 indicates entry to a rise detection phase of the program, where it is assumed that the compressor is cut-out and the system is losing air pressure due to leakage or exogenous demands for air. Pressure readings P(1) and P(2) for the current period n are taken as indicated at step 604 and the measurements compared to find the lower of the two to which becomes the value for the variable Press. At step 608 it is determined if the variable Press has been set equal to the reading P(1). If YES, variables T and L are set to 1 and 2, respectively (step 610), in NO, variables T and L are set to 2 and 1, respectively (step 612). Following step 610 or 612 a comparison is executed to determine if one of variables P(T){n} (i.e. P(1){n} or P(2){n} where n is the current period) is less than or equal to P_min. Initially the result of the comparison is almost always "YES". P_min is initially set to 150 and any pressure measurement should be less than 125. Along the YES branch from the comparison P_min is reset to equal Press (step 616), the counter RiseCount is set equal to 0 and P_max is set equal to P(T){n}. Later instances of execution of steps 616 and 618 will be triggered by falling or steady pressure since P_min will be determined by readings from the prior periods. The program then executes a return to step 602 and another set of samples P1, P2 is read.

Consider now the NO branch from the comparison test of step 614. Another comparison step 620 is executed to compare P(T){n} to P_max to determine if P(T){n} is greater than P_max. P_max will always be one of P(T){n–1, n–2, n–3, or n–4} so P(T){n} (see steps 618, 624), which is a current sample, is being compared with an earlier sample in its stack. If the comparison fails then execution follows the NO branch to comparison step 622 where it is determined if the counter variable RiseCount has reached its limit value. Because RiseCount has not yet been incremented, and was initially set to 0, the NO branch from step 622 is followed back to step 602 for depression of the stack and the collection of another set of samples. Where P(T){n} is greater than P_max, indicating an increase in the current pressure measurement over any previous recent pressure measurements, execution proceeds along the YES branch from step 620 to step 624, where P_max is reset to P(T){n}. Next, at step 626 the variable RiseCount is incremented and at step 628 it is determined if RiseCount is equal to 1, which will occur only on the first occasion of detection of a possible series of increasing pressure readings. This is the occasion of setting of two variables, BackTrack and BackTime, to the values P(L){n–1} and Clock-1, respectively (step 630). Following step 630 execution returns to step 602 through decision step 622. Only following a "No" determination at step 628 can RiseCount time out, indicating the occurrence of three increases in the measured maximum pressure reading without an intervening change in the minimum pressure reading. This is taken as detection of a upward turning deflection point and as an indication of rising pressure in the storage tank.

The portion of the algorithm relating to the response to the detection of rising pressure requires initialization of several variables and counters as indicated in steps 632, 636, and 640. The variables include "StartTime", which is initialized to the value "Clock-3"; the flag "Rising", which is set to 1;

and three variables, "PointCount", "RPM_total" and "Speed_total", all of which are set to 0. The variables allow adjustments to the measurement of pressure rise time to compensate for engine and vehicle speed. The variable Clock is adjusted by a constant balancing of the maximum allowed RiseCount. Leakage continues to be monitored (step 634) and data is recorded (step 638). Governor cut-in pressure is recalculated each time rise detection is initiated and is made equal to the average of the five most recently calculated cut-in pressures. This is provided by taking the average of P_min, GovIn{n-1}, GovIn{n-2}, GovIn{n-3}, and GovIn{n-4} at step 642. The variable P_max is confirmed to be P(T){n} at step 644 and new data is read, resetting P(T){n}, at step 646.

Before the new pressure readings are used for comparison tests, the old P_max, carried over from the rise detection phase of the algorithm, is compared to cut-out pressure, less an error factor (GovOut*GovErr), at step 648. Ordinarily, it would be expected that the P_max value has been reset to a value in the P(T) stack at step 624, and should be less than this value. Where this is the case program execution advances along the NO branch to step 650, where it is determined if the counter "SpikeDrops", which is initially 0, has counted out. If NO, step 652 is executed to determine if pressure has continued to rise and a current pressure measurement P(T){n} is compared to P_max to determine if it is at least equal to the pressure reading from the previous measurements. Normally, on the occasion of the first local instance of execution of the step, the value for P(T){n} can be expected to exceed that for P_max. If it does, the YES branch from step 652 leads to execution of a another comparison test, step 654. This step is executed to determine the value of a flag "SpikeFlag", which indicates occurrence of a drop in the current pressure measurement since the most recent detection of rising pressure, i.e. since the last instance of compressor cut-in. The expected value is 0, which if met causes execution to skip to step 658, where P_max is reset to the current pressure measurement. If the spike flag is set, step 656 precedes execution of step 658 and the variable "SpikeStart" is set to the current clock for accumulation of rise time.

Following step 658, a determination is made if the "SpikeLoop" flag has been set, indicating an immediately previous occurrence of a current pressure reading falling below the prior period's pressure reading, as detected at step 652. If not, execution proceeds along the branch from step 660 leading to steps 662, 664, 666 and 668. These steps reflect the resetting or incrementation of several variables, including, respectively, resetting "SpikeStart" equal to the current value of Clock; resetting "Speed_Total" to the sum of the previous Speed_Total and current speed measurement; resetting "RPM_Total" to equal to the sum of the old RPM_Total and the current measured RPM; and finally incrementing the counter "PointCount", which will reflect the number of times Speed_Total and RPM_Total are incremented to allow calculation of an average for the two variables. Following step 668 processing returns to step 646 and a new set of variables are read.

Returning to step 652, the case where the current pressure measurement P(T){n} has fallen, or has remained, below a prior measurement during the current rise detected phase of the algorithm is considered. Following the NO branch from step 652 it may be seen that steps 670, 672 and 674 are executed, which in turn set "SpikeFlag" to 1, "SpikeLoop" to 1 and increment the counter "SpikeDrops". SpikeDrops is the most significant of these since its accumulation to a value equal to 8 aborts the rise detect portion of the algorithm when detected at step 650. The YES branch from step 660 is followed only after a prior pass through steps 670, 672 followed by an indication that pressure is again rising prior to an abort. Steps 676, 678 and 680 provide for resetting "SpikeTime" to the old value for SpikeTime plus the current Clock less the time for "SpikeStart". In other words, the elapsed time corresponding to a period when pressure is dropping, or is rising, but has not yet recovered to the point where the interruption occurred, is accumulated in "SpikeTime". SpikeStart is then set to the current clock and the SpikeLoop flag is reset to 0. Processing returns to step 646 for the collection of new data.

As stated above, accumulation of a "SpikeDrops" count equal to 8 results in the process being aborted. No updates to governor cut_out occur under these circumstances and the process is advanced to a series of exit steps which reflect resetting variables for the next iteration of the leak monitoring and rise detection steps including steps 602 through 630. These steps include resetting the flag termed "Rising" to 0 (step 682), writing data to a file (step 684), resetting P_min to the current pressure measurement P(T){n} (step 686) and resetting the SpikeFlag to 0 (step 688) before the algorithm is exited.

Returning to step 648, the steps of the algorithm occurring once P_max has reached a value close to the governor cut-out pressure less an error factor are considered. Following the YES branch from step 648, timing of rise time must discontinue and accordingly a variable "EndTime" is set equal to the current clock reading (step 690), anticipating that the compressor has been cut out. Next, at steps 692 and 694 the variables RPM_total and Speed_Total are reset and the counter PointCount incremented, tracking steps 664 through 668. Vehicle speed is tracked for the use of other processes. The value accumulated for RiseTime is adjusted as a function of engine RPM's. At this point in the process declining pressure is taken as confirmation of compressor cut-out. The current pressure measurement is compared to P_max at step 698. If the current measurement at least equals P_max, indicating the cut-out has not occurred, P_max is reset to the current pressure measurement, the variable EndTime is reset to the current clock (steps 700, 702) and another set of pressure measurements is taken (step 704). Otherwise, the NO branch from step 698 results in execution of a comparison (step 708) between the current measurement and the pressure measurement for the immediately preceding period. If the current measurement reflects an increase in pressure, processing returns to step 704 for yet another round of data measurements. If the current measurement indicates that pressure is steady or falling since the last measurement, the variable FallCount is incremented and at step 710 it is determined if FallCount has reached a value high enough to trigger an exit from the loop. If not, processing loops back through step 704 for still more pressure measurements. If YES, processing advances to steps providing from re-determination of the expected governor cut-out pressure level.

The expected governor cut-out pressure level and the expected rise time from cut-in to cut-out are determined ignoring intervening demands for air pressure and recovery. Expected rise time may require consideration of operating conditions. First, at step 712, the average of engine RPM measurements made during the rise detected portion of the algorithm is made. Step 712 provides for determining the average "RPM_avg" from the accumulated RPM measurements divided by the number of samples "PointCount". Next, at step 714, a new, current governor cut-out pressure level is determined by averaging the final value for P_max with the prior four determinations of the governor cut-out pressure level. The oldest value is discarded. Rise time determinations take account of interruptions in pressure increase by determining first if any such interruption occurred. Step 716 checks the flag SpikeFlag. If the flag has not been set RiseTime is simply the EndTime of the rise detect portion of the algorithm less its StartTime (step 718). Otherwise RiseTime is adjusted to exclude what is termed "SpikeTime" which accumulates over periods when declining pressure measurements, and recovery from the period, occur (step 720). The time rate of change of pressure over time (Slope) may now be calculated by subtracting final maximum pressure from the initial minimum pressure and dividing the result by RiseTime (step 722) from either step 718 or 720. Slope is used in the inspection routines. The final step preceding the reset steps (steps 682 to 688) is step 724, which provides storage of the calculated slope as "System_Data_Change".

Figure 6A:
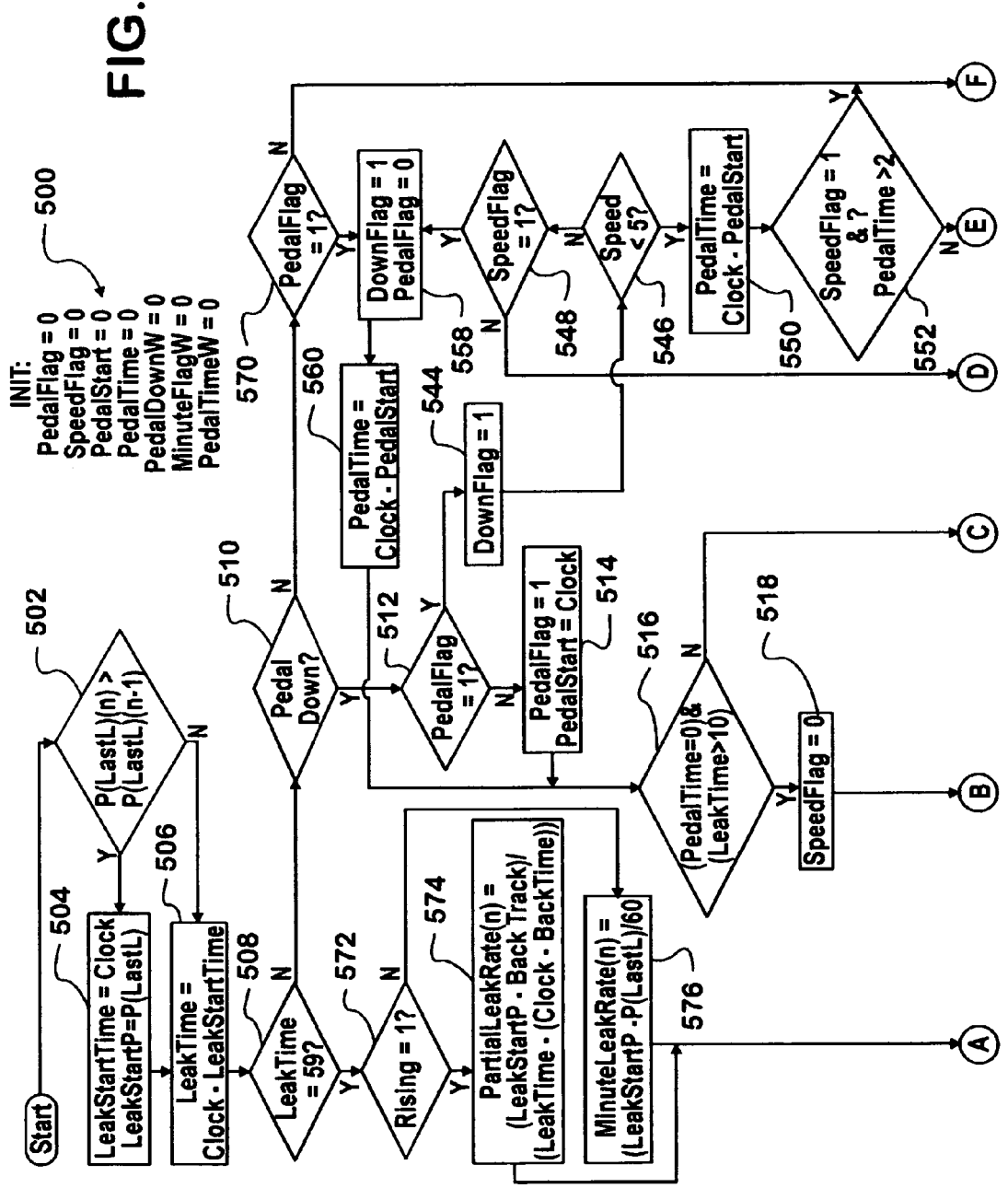
Figure 6B:
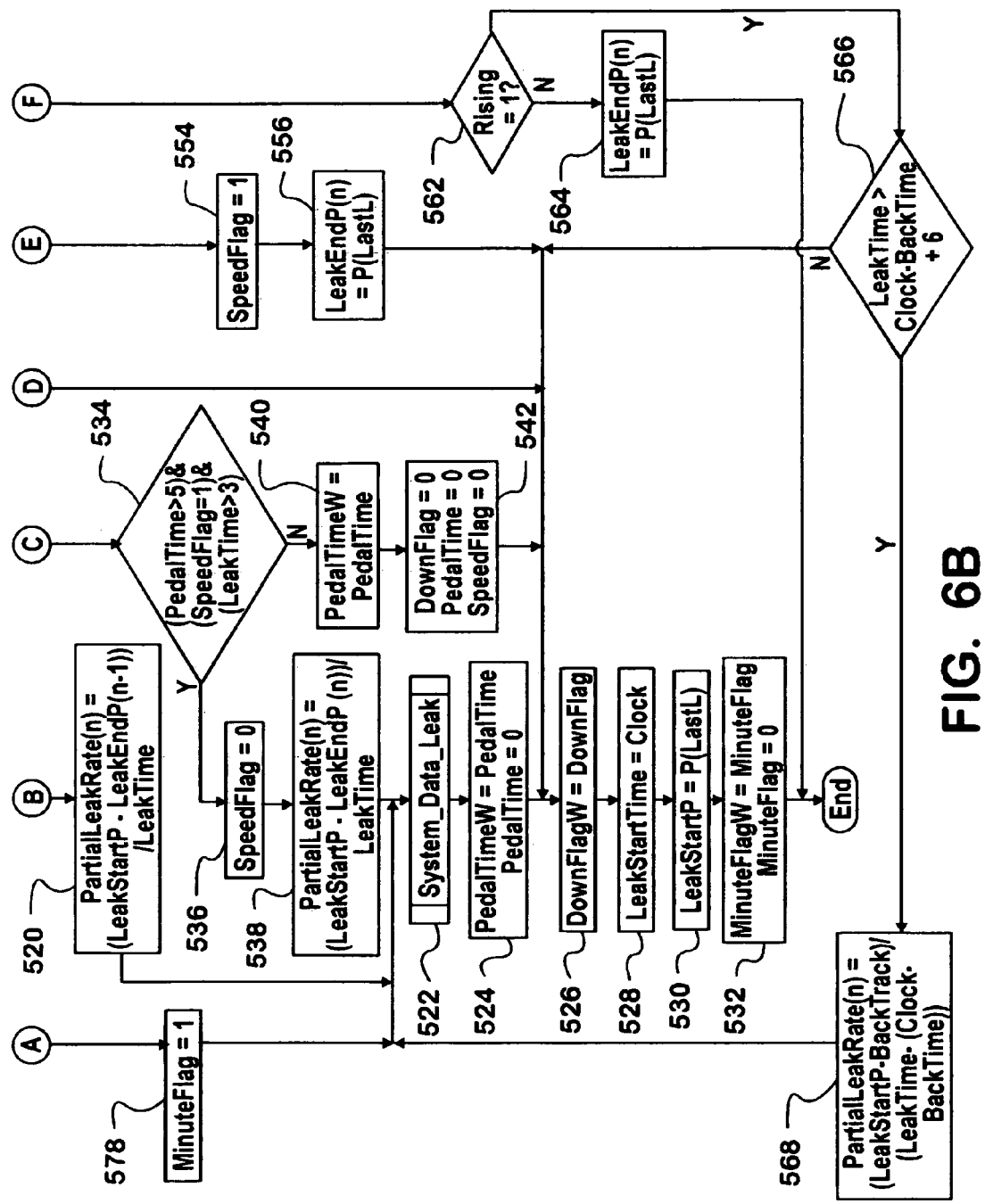
Figure 7:
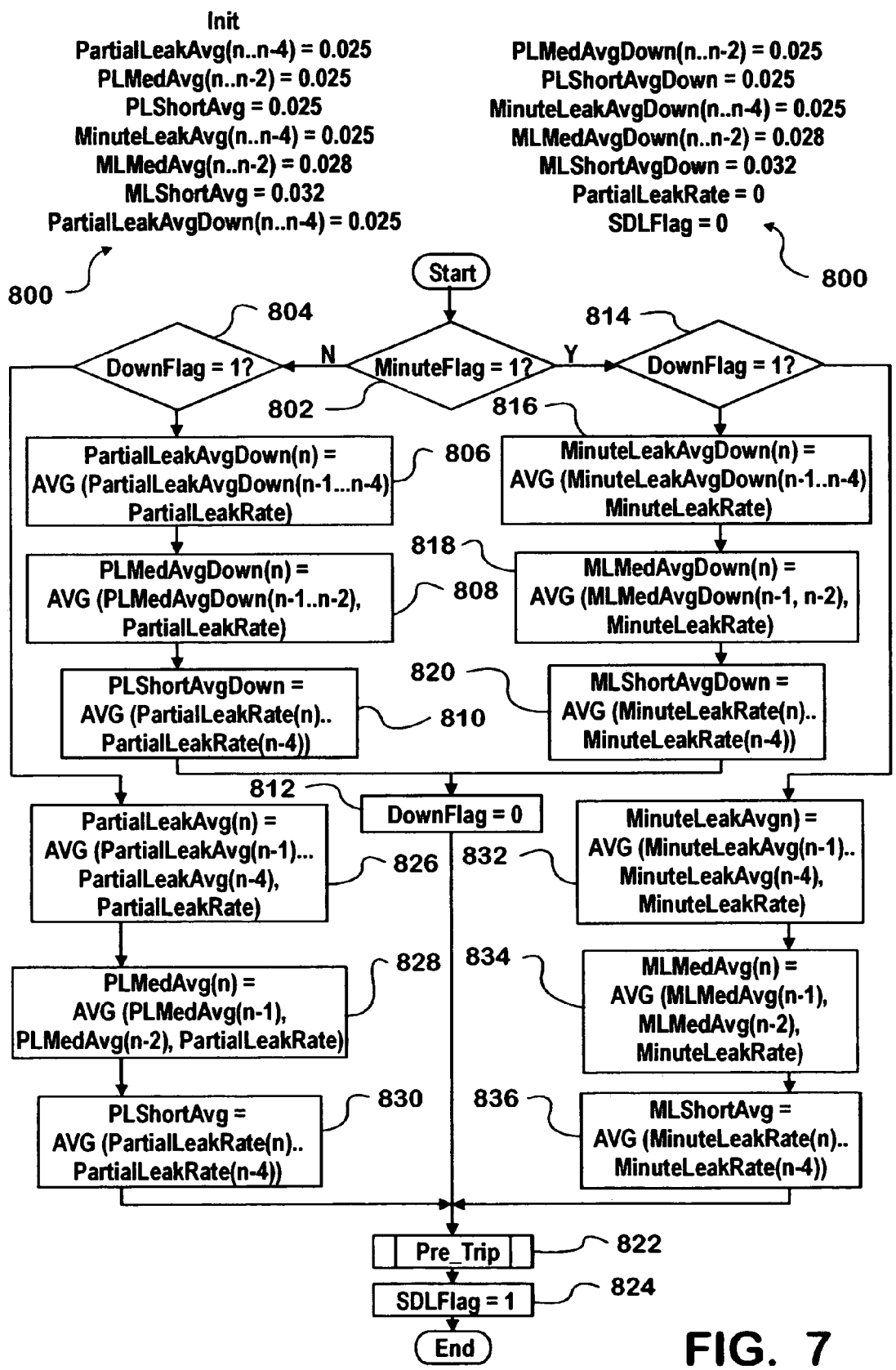

FIG. 6 illustrates a routine executed by body computer 44 monitoring air tank pressure for leakage (the Monitor_Leakage routine). The routine of FIG. 7 is passed the values LastL (step 600), Rising (step 682), BackTime (see step 630) and P(1,2){n, . . . , n–4} from the routine of FIG. 6. List 500 defines a plurality of flags including: PedalFlag; SpeedFlag; PedalStart; PedalTime; PedalDownW; MinuteFlagW; and PedalTimeW, all of which have the initial value 0 on engine start. Step 502 is a simple comparison of pressure measurements from the immediately preceding two measurement cycles, which may be P1 {n–} or P2{n} against either P1{n–1} or P2{n–2}. Depending upon the result of the comparison of Step 502, execution advances directly to step 506 (the NO branch) or to step 506 through an intervening step 504 (the YES branch). In essence, processing along the YES branch from step 502 is indicative that pressure in the system is increasing while the NO branch is indicative that pressure is steady or falling. "NO" is taken as a sign to monitor leakage and "YES" indicates the process is not in a leak measurement cycle. Accordingly, at step 504, following a YES determination, the variable LeakStartTime is updated to the current clock and the variable LeakStartP is updated to the current pressure reading P(LastL). In this way once steady or declining pressure is detected the base values for subsequent calculations will have already been recorded and the values will reflect near peak pressure for the system and the time when peak pressure occurred. At step 506, following step 504, LeakTime will be calculated to be 0 since the variable LeakStartTime will have just been set equal to the clock. Otherwise, since LeakStartTime will not have updated, the step will operate in effect to increment the value for the variable LeakTime by the time that has passed since the last execution of step 506. However, rather than determining the increment, the entire accumulated time is recalculated each cycle.

Step 508 determines if a full one minute leak measurement phase has timed out, that is if LeakTime has grown to exceed 59. If the measurement cycle has not timed out processing follows the NO branch from step 508 to step 510 where it is determined if the brake pedal is down. The position of the brake pedal is known to body computer 44 from a brake pedal position sensor 56. A down brake pedal indicates that the vehicle is using air pressure for activating the brakes and the measurements are used for the leak measurements while the brake system is actuated. Following the YES branch from decision step 510 leads to a second inquiry (step 512) to the effect of whether the break pedal was down the previous cycle through the routine, which is indicated by the flag "PedalFlag" being equal to 1. Assuming initially that the pedal was not depressed the NO branch from decision step advances the routine to execution of step 514, where the flag PedalFlag is reset to 1 and the variable PedalStart (indicating the time the pedal is initially depressed) is set equal to the Clock.

Next step 516 is executed. If step 516 is entered from step 514 then LeakTime (from step 506) and PedalTime (defined in Init list 500) will both equal 0 and the test produces a negative result (because LeakTime is not greater than 10). Following the NO branch from step 516 leads to a second decision step 534. Step 534 is a three part test, which again, the first time through the routine following a reset, cannot be satisfied because of the variable PedalTime and the flag SpeedFlag have values of 0. Following the NO branch from step 534 the variable PedalTimeW is set equal to PedalTime (initially 0) at step 540, PedalTime is reset to 0 and the flags DownFlag and SpeedFlag are set to 0.

The conditions of step 534 are satisfied when a minimum time of depression of the brake pedal, low vehicle speed and accumulated leak time (i.e. a period of steady or declining pressure) occur simultaneously. Following the YES branch from step 534 the flag SpeedFlag is reset to 0 (step 536) and a data point for the variable PartialLeakRate{n} is determined by taking the difference between LeakStartP and LeakEndP{n} and dividing the result by accumulated LeakTime. Next the results obtained may be passed to the routine System_Data_Leak (step 538). Next, at step 524, the variable PedalTimeW is set equal to PedalTime and PedalTime is then reset to 0. Steps 526, 528, 530 and 532 are then executed as already described. The routine concludes until clock conditions indicate return to step 502.

Returning to step 516 the circumstances leading to a YES result are considered. Here the variable PedalTime is 0 and the variable LeakTime is greater than 10. Recall all times are normalized based on engine speed, thus 10 is not assigned the unit "seconds". Steps 518 and 520 follow, with the flag SpeedFlag being reset to 0 and a partial period leak rate (PartialLeakRate{n}) being determined using a formula taking the difference between LeakStartP less LeakEndP{n–1} and dividing the result by LeakTime. Processing then continues at step 522 as previously described.

Following completion of step 542 a second group of variables and flags are reset. This set is required to be given starting values upon initial determination of the beginning of a leakage monitor period. Steps 526, 528, 530 and 532 provide for setting: DownFlagW equal to DownFlag (see step 544, described below); LeakStartTime equal to the clock; LeakStartP (leak monitoring cycle start pressure) equal to the last pressure measurement (P(PLast)); MinuteFlagW equal to the current MinuteFlag and MinuteFlag is then set to 0. Execution then ends until the system clock determines the appropriate time to renew execution at Start.

Returning to step 512 consideration is given to circumstances under which the variable PedalFlag was equal to 1. Depressing the brake pedal is a required part of testing the air compression and storage system. When the test is done manually the vehicle is not moving. In the automated routine described here the test is done when the vehicle is stopped or moving at no greater than a predetermined maximum speed. Following the YES branch from step 512 a flag termed DownFlag is set equal to 1 (step 544). Next, at step 546 it is determined whether vehicle speed (reported by vehicle speed sender 84) falls below a maximum limit (here 5 mph). If Speed equals or exceeds the threshold, the NO branch from the test is followed to decision step 548, where the status of the flag SpeedFlag is determined. Assuming SpeedFlag has not been reset to 1 (its initial value is 0) the test will fail and the NO branch is followed from step 548 to step 526 with the actions described above. The flag SpeedFlag is set following an execution path following the YES branch from step 546.

If the flag SpeedFlag equals 1 upon execution of decision step 548, the YES branch advances execution to step 558 where the flag DownFlag is set equal to 1 and the flag PedalFlag is set equal to 0. Next, at step 560 the variable PedalTime is set equal the difference between the variable Clock and the variable PedalStart, which was set from Clock previously. Execution then continues to decision step 516 as described above. This execution route also occurs along the YES branch from step 570. This route is consistent with a determination at step 510 that brake pedal status is not down and a determination at step 570 that the PedalFlag is set.

Returning to step 546 the circumstances relating to vehicle speed matching or falling below the threshold are considered. Following the YES branch from step 546 the variable PedalTime is assigned the value determined by subtracting PedalStart from the current value of Clock (step 550). Following step 550 the status of the flag SpeedFlag and the elapsed pedal depression time are checked at step 552. If SpeedFlag has previously been set and the brake pedal depression time exceeds a minimum threshold the YES branch is taken to step 562 where the status of the flag Rising is evaluated. This path merges with the NO branch from step 570, i.e. the execution path followed from that step in the PedalFlag was not high. The Rising flag is subject to being set in the routine Monitor_Charge_Time at steps 636 and 682. If the Rising flag is 0, the NO branch is taken to step 564 and the variable LeakEndP{n} is set to the last pressure measurement P(LastL) and the routine is exited.

The YES branch from step 562 leads to a determination as to whether the variable LeakTime exceeds the Clock less the quantity BackTime plus 6 units. BackTime is passed from the Monitor_Charge_Time routine, step 630. If a sufficient period has passed to generate a YES result, a partial period leak rate may be determined and processing advances to step 568 for determination of the variable PartialLeakRate{n}, which is equal to the pressure difference between LeakStartP and BackTrack (from step 630) divided by the period LeakTime less the difference between Clock and BackTime. Execution then advances to step 522 as already described.

A negative result from step 566 results in processing skipping to step 526 which has already been described. Similarly, a negative result at step 552, that is the failure of either condition of SpeedFlag equaling 1 or PedalTime not being greater than 2 (seconds at standard conditions) also results in the routine skipping to step 526, with intervening steps 554 and 556, which provide for confirming that SpeedFlag is set to 1 and for populating LeakEndP{n} with the pressure reading P(LastL).

The routine of FIG. 6 also provides for timing out of a full one minute pressure test. From step 508, following timing out of the variable LeakTime, the YES branch passes to step 572, which determines if the Rising flag has been set high. A yes result indicates an interruption having occurred prior to the timing out of the process, in which case the results can be used to determine a partial period leak rate. A NO result indicates a full minute period was accumulated. Steps 574 and 576 follow the respective results before the routine merges for setting of the MinuteFlag flag at step 578. Step 574 generates a value for PartialLeak{n} by dividing the pressure quantity (LeakStartP—BackTrack) by the period of LeakTime less the difference of Clock less BackTime. After step 578 the program advances to step 522 to pass data to the System_Data_Leak routine.

FIG. 7 illustrates a routine used to generate values for variables representing partial period leakage, leakage over a full minute, and average over various sample sizes stretching back in time, for both the brake pedal down and the brake pedal up conditions. The variables representing all of these conditions are factory preset, or reset after servicing of the air compressor system, to various values as indicated in the Init (initial value) list 800. The various initial values indicated correspond to rates of pressure change or, in the case of SDLflag, are a flag. The program starts whenever called by step 522 in the routine of FIG. 7. The first step of the routine determines if a full minute has timed out (step 802, MinuteFlag=1). If not, step 804 is executed along the NO branch to determine if the DownFlag has been set high, indicating a current brake pedal down event. By "current" is meant a currently depressed brake pedal or a brake pedal down event since the last reset of the flag. In other words, a determination is made as to whether the leak rate was measured during the condition of the brake pedal being down or up. If down, the YES branch is followed to step 806 for updating of two running averages and one current average that are maintained corresponding to what are termed: the brake pedal down partial period leak rate average (step 806); the brake pedal down partial period medium sample size average (step 808); and the break pedal down partial period current average (step 810). The first variable is identified as PartialLeakAvgDown{n} and is an average of the four prior period averages and the current measurement of the leak rate over part of a minute. The second variable, termed PLMedAvgDown{n} is the average of the prior two period values for PLMedAvgDown and the current partial period of the leak rate. Finally, the last, least stable variable is the PLShortAvgDown which is the average of the current and four previous measured leak rates. In other words, each successive value has less "memory" of what occurred previously. PLShortAvgDown has no memory at all of events prior to the current and four most recent prior samples taken over partial periods.

Following a determination that a full minute measurement was taken following the YES branch from step 802 the routine determines if a full minute has timed out (step 802, MinuteFlag=1?). If YES, step 814 is executed along the YES branch to determine if the DownFlag has been set high, indicating a current brake pedal down event. If a down event has occurred, the YES branch is followed to step 816 for updating of two running averages and one current average that are maintained corresponding to what are termed: the brake pedal down minute leak rate average (step 816); the brake pedal down medium sample size average (step 818); and the brake pedal down current short sample size average (step 820). The first variable is identified as MinuteLeakAvgDown{n} and is an average of the four prior period minute leak averages and the current leak rate measured over a full minute. The second variable, termed MLMedAvgDown{n} is the average of the prior two period values for MLMedAvgDown and the current measured over a full minute leak rate. Finally, the last, least stable variable is the MLShortAvgDown which is the average of the current and four previous measured full minute leak rates. In other words, each successive value has less "memory" of what went on previously until MLShortAvgDown, which has no memory at all of events prior to the current, i.e. most recent, and four most recent prior samples, taken over full minute periods.

Following either of steps 810 or 820 step 812 is executed to reset DownFlag to 0. Thereafter the recomputed averages are passed to the Pre_Trip routine of FIG. 9 (step 822) and the SDLflag flag is set to 1 (step 824).

Consideration will now be given the circumstance where the DownFlag did not equal 1 at steps 804 and 814. If no brake pedal down event is detected at step 804, the NO branch is followed to step 826 for updating of two running averages and one current average that are maintained corresponding to what are termed: the partial period leak rate average (step 806); the partial period medium sample size average (step 808); and the partial period current average (step 810). The first variable is identified as PartialLeakAvg{n} and is an average of the four prior period averages and the current partial leak rate. The second variable, termed PLMedAvg{n} is the average of the prior two period values for PLMedAvg and the current partial leak rate. Finally, the last, least stable variable is the PLShortAvg which is the average of the current and four previous measured leak rates taken while no brake pedal down event has been encountered. Again, each successive value has less "memory" of what went on previously until PLShortAvg, which has no memory at all of events prior to the current and four most recent samples.

Following the NO branch from step 814. If no down event has occurred, the NO branch is followed to step 832 for updating of two running averages and one current average that are maintained corresponding to what are termed: the minute leak rate average (step 832); the medium sample size average (step 834); and the current short sample size average (step 836). The first variable is identified as MinuteLeakAvg{n} and is an average of the four prior period minute leak averages and the current full period leak rate. The second variable, termed MLMedAvg{n} is the average of the prior two period values for MLMedAvg and the current full period leak rate. Finally, the last, least stable variable is the MLShortAvg which is the average of the current and four previous measured full minute leak rates. Each successive value has less memory of what went on previously until MLShortAvgDown, which has no memory at all of events prior to the current and four most recent samples.

Figure 8:
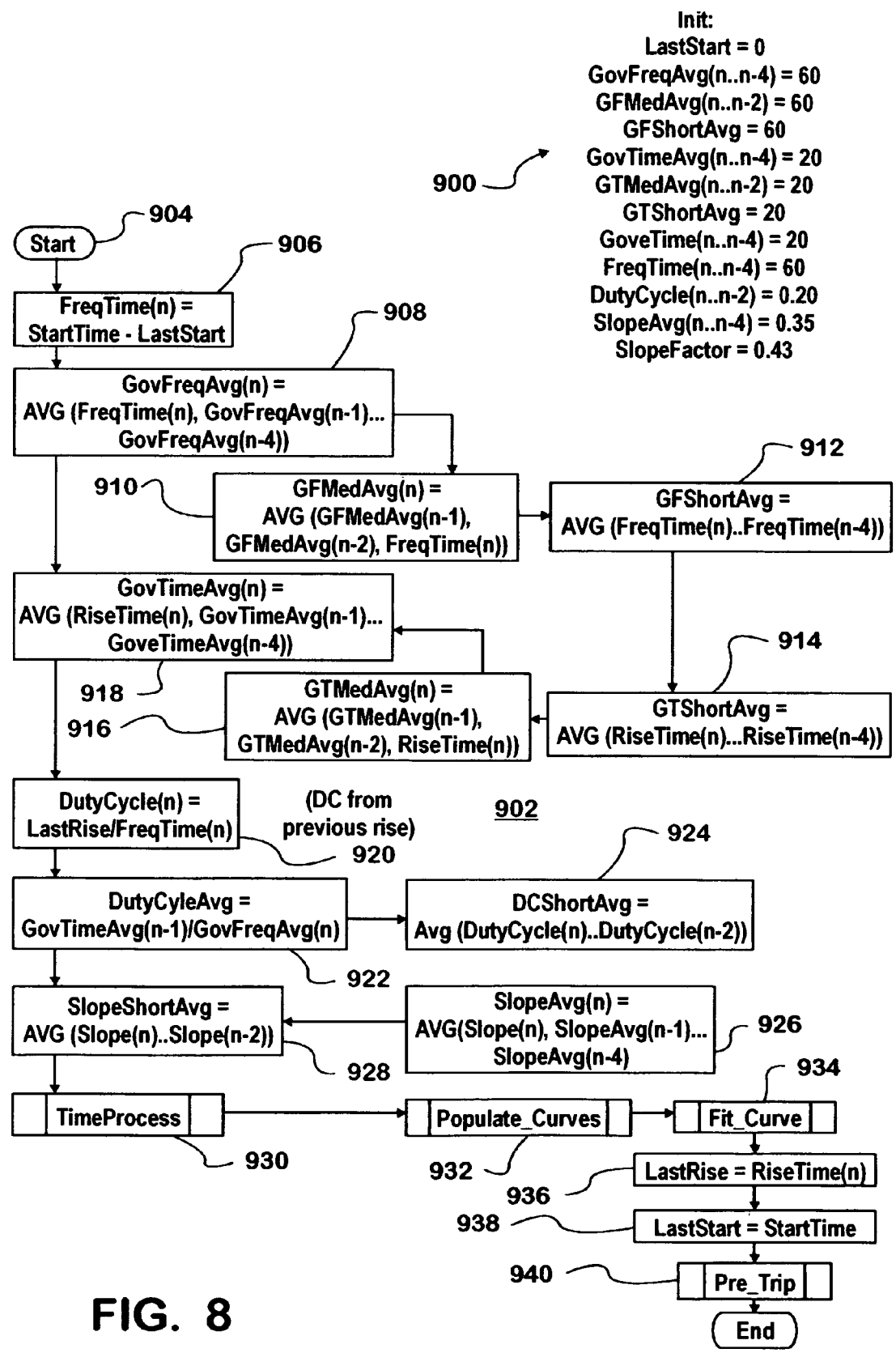

FIG. 8 is a flow chart of a routine 902 that includes a subroutine termed the System_Data_Charge routine. Routine 902 determines average slopes from the slope stacks developed in the routine of FIG. 5. The full routine tracks compressor governor on time, operational frequency and generates the norms for governor operation to be used for the comparisons required for utilizing the diagnostic matrix of FIG. 4.

Table 900 is a list of variables utilized in routine 902. The variables includes "LastStart" which has an initial value of 0 and is used as a base in tracking the time intervals between engagement of the compressor 16. A second group of variables is "GovFreqAvg{n, ..., −4}", all of which are initially set to 60 (seconds). The variable name is an abbreviation for Governor Frequency Average, and the initial value is an exemplary expected time interval. The variable represents the anticipated average gap between instances of engaging compressor 16. Three flavors of variable are used, the most stable being "GovFreqAvg" which averages a current measurement with the last four calculated averages. A variable of intermediate stability is GFMedAvg, which is essentially the same, only a shorter stack of old averages is used. Finally, GFShortAvg is the most sensitive norm provided, it being a simple average of the current and prior three measurements of the time between compressor cut in. The variables "GFMedAvg{n, ..., n−2} and GFShortAvg (GF standing for Governor Frequency) relate to averaging the frequency of the governor cycling on and off. The first group and second variable are initially set to 60. The variable "FreqTime" standing for actual measurements is related to this group.

Routine 902 is entered at step 904. At step 906 the variable FreqTime{n} is set equal to StartTime less LastStart. In other words, the period between cut-ins of the compressor is measured and stored as "FreqTime{n}. Next, with step 908, the stack GovFreqAvg is updated by calculating a new value for GovFreqAvg{n}. This is done using prior values, the old values having been automatically pushed down and the oldest value being discarded. The prior values and the current measurement (FreqTime{n}) are averaged to obtain the new value. At step 910 governor frequency related variables are updated. The operation is essentially the same here, only a shorter stack of variables is used.

The next factor dealt with is compressor duty cycle time, which is dealt with in steps 914, 916 and 918. The next variable defined is "GovTimeAvg{n, ..., n−4}" reflects the average duration of a duty cycle for the governor, which is set to 20 (seconds). The next three variables and groups of variables (GTMedAvg, GTShortAvg and GovTime) are all related to duration of duty cycle measurement and averaging. The variable "DutyCycle {n, n−1,n−2}" is a initial variable related to the proportion of time that the governor is in operation. It is updated at step 920 by dividing "LastRise by FreqTime{n}. DutyCycleAvg is updated at step 922 by dividing an older GovTimeAvg by the current GovFreqAvg. Step 924 relates to a norm called DCShortAvg, a more senstive variation on duty cycle that uses relatively current measurements rather than the averages used for determining DutyCycleAvg. An initial value provides an estimate that the compressor is in operation 20% of the time.

The variables containing the term "Slope" relate to expected charge rates for the storage tanks. Steps 926 and 928 relate to this. Again relatively stable (SlopeAvg) and sensitive (SlopeShortAvg) versions of the norm are developed.

Two slope averages, corresponding to estimating pressurization times for the air pressure system are maintained. SlopeAvg{n} is the average of the current slope (Slope{n}) and previously determined slope averages for the four most recent periods (step 926). SlopeShortAvg is an average of the current and two most recent slope determinations (step 928). Step 930 labeled TimeProcess allows passing of the data to another routine which does not effect the current invention. Steps 936-938 provide for determining a value for LastRise which is set equal to the current value for RiseTime{n} and LastStart which is set equal to StartTime. The data is then passed to the Pre_Trip routine, step 940.

Figure 9:
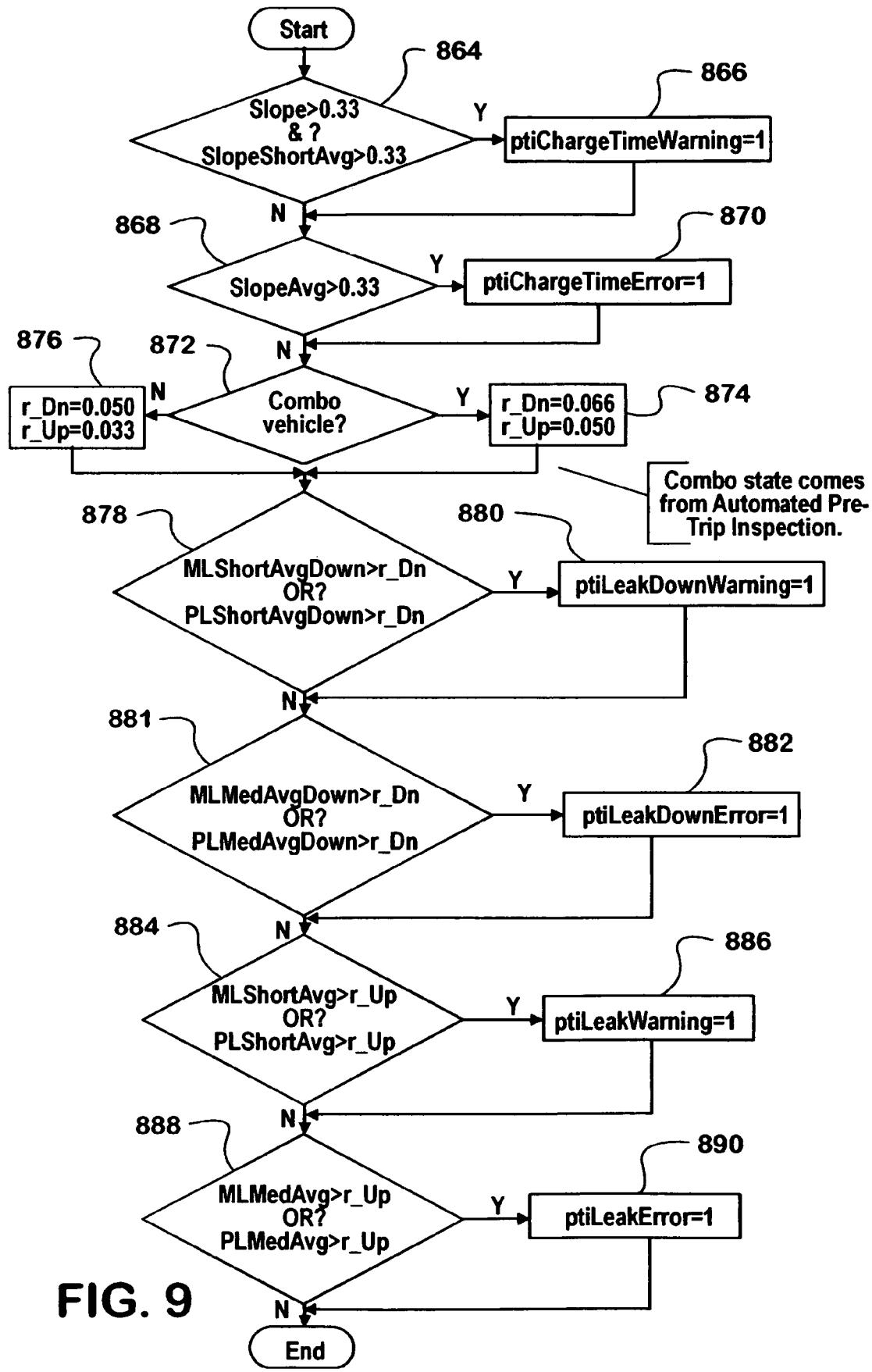

FIG. 9 is a flow chart for the Pre_Trip inspection routine, involving comparison of the values developed in the routines of FIGS. 8 and 9 against alarm level thresholds. The first comparison is at step 864 where the values Slope and SlopeShortAvg are compared against a first threshold warning level, which if exceeded by both variables results in a pre-trip inspection air compressor charge time warning flag being set (step 866). Next, the value SlopeAvg is compared to the same threshold, which if exceeded, results in a pre-trip inspection air compressor charge time error flag being set (step 870). Leakage rates can expected to be higher if a vehicle is a compound vehicle, i.e. one including both a tractor and trailer as opposed to just a tractor. Accordingly, before the leakage rate comparison tests are run, it is determined whether a trailer is present as indicated at step 872. Depending upon the result a different set of threshold comparison values is loaded (steps 876 or 874). All of the leakage rate tests fail if either component fails. At step 878 the values for MLShortAvgDown and PLShortAvgDown are compared against their respective thresholds, and, if either exceeds the maximum allowed period, a pre-trip inspection leak for brake down warning flag is set (step 880). At step 881 the values determined for MLMedAvgDown and PLMedAvgDown are compared against their respective thresholds, and, if either exceeds the maximum allowed period, a pre-trip inspection leak for brake down error flag is set (step 882). At step 884 the values for MLShortAvg and PLShortAvg are compared against the respective thresholds, and, if either exceeds the maximum allowed period, a pre-trip inspection leak warning flag is set (step 886). At step 888 the values for MLMedAvg and PLMedAvg are compared against their respective thresholds, and, if either exceeds the maximum allowed period, a pre-trip inspection leak error flag is set (step 890). Error flags are considered more serious than a warning flag, an error being taken as indication of failure while a warning is deemed as indicating trending toward failure. The logic of matrix 400 and table 402 may be applied at each point where a new measurement of a variable listed in the matrix is taken.

The invention provides an automatic system which reduces downtime from unscheduled maintenance and repair. This is achieved through improved prognosis and diagnosis of potential problems. Reduced service time and increased vehicle up time are expected as a consequence through the ability to reliably schedule maintenance in advance of a problem. Instead of relying on operator observations, vehicle mileage or age, the invention monitors and provides for the analysis of air system charge and discharge cycles to determine the presence of air system leaks, the likely location of air systems leaks, the efficiency of the air compressor and the possibility of water infiltration into the system. Results are automatically reported to alert the operator, service technician or central office so that action can be taken.

While the invention is shown in only one of its forms, it is not thus limited but is susceptible to various changes and modifications without departing from the spirit and scope of the invention.

What is claimed is:

1. A system for estimating the condition of a compressed air supply system installed on a motor vehicle, the compressed air supply system having a prime mover, a compressor coupled to be energized by the prime mover, a governor controlling engagement of the prime mover to the compressor, an air line from the compressor, a storage tank coupled to receive compressed air from the air line and an outlet air line from the storage tank for connection to a vehicle subsystem requiring pressurized air, the system comprising:
   an air pressure sensor communicating with the storage tank for measuring air pressure therein and generating an air pressure signal of the measurements;
   a brake pedal position sensor indicating a brake pedal up or a brake pedal down status;
   a source of a clock signal;
   a source of a cycle interval norm for the compressor, a duty cycle norm for the compressor, a maximum air pressure norm for the storage tank, a minimum air pressure norm for the storage tank, norms for pedal up and pedal down leak rates;
   an information processor having access to the norms, the air pressure signal, the clock signal and connected to receive the status of the brake pedal, and programmed to correlate variance in measurements of the air pressure from the maximum and minimum air pressure norms for the storage tank, variance in duration of charging time for the storage tank from the duty cycle norm, and variance in frequency of charging of the storage tank from the cycle interval norm with at least a first potential or actual fault condition.

2. A system as defined in claim 1, wherein the prime mover is an engine, the system further comprising:
   a tachometer coupled to the engine for measuring engine speed; and
   the information processor being coupled to receive engine speed measurements from the tachometer and programmed to use the measurements of engine speed for normalizing measurements of duty cycle for the compressor before comparison to the duty cycle norm.

3. A system as defined in claim 2, further comprising:
   logic which indicates,
      a potential compressor problem if measured duty cycles exceed duty cycle norms but there is no concurrent increase in frequency in compressor operation,
      a governor problem if, compared with the respective norms, any of the following occur, measured cut in pressure is too low, if measured cut in pressure is too high, cut out pressure is too low, or cut out pressure is too high,
      a problem with the mechanical linkage between the engine and the compressor if duty cycles exceed duty cycle norms and none of the following are true, measured air tank pressure never hits its desired maximum, the brake pedal up leak rate has risen against its norm and pedal down pressure has risen against its norm,
      a leak ahead of the storage tank if duty cycle intervals have decreased and either of the following is true, measured storage tank pressure never reaches its desired maximum air pressure norm or duty cycle intervals have increased,
      a leak at the storage tank if duty cycle intervals have decreased and duty cycle times have increased and either of one of the following two conditions obtain, the pedal up leak rate has increased or the pedal down leak rate has increased,
   a leak after the storage tank if duty cycle intervals have decreased and the pedal down leak rate has increased without occurrence of an increase in duty cycle time and an increase in the pedal up leak rate, and
   water in the storage tank if duty cycle times decrease.

4. A system as defined in claim 2, further comprising:
   logic which indicates,
      unmetered air use if duty cycle frequency increases without an increase in duty cycle time.

5. A compressed air supply system for a motor vehicle, the compressed air supply system comprising:
   an engine and a source of an engine speed signal;
   a compressor mechanically linked to be energized by the engine;
   a governor controlling engagement of the engine to the compressor;
   a storage tank;
   an air line coupling the compressor to the storage tank for the delivery of compressed air;

an outlet air line from the storage tank for connection to a vehicle subsystem requiring pressurized air;

an air pressure sensor communicating with the storage tank for measuring air pressure therein;

a brake pedal position sensor indicating a brake pedal up or a brake pedal down status;

a source of a cycle interval norm for the compressor, a duty cycle norm for the compressor, a maximum air pressure norm for the storage tank, a minimum air pressure norm for the storage tank, and norms for pedal up and pedal down leak rates;

a body computer generating a clock signal and having access to the source for the plurality of norms, the body computer being further connected to receive measurements of the air pressure in the storage tank, to receive the brake pedal status indications, and to receive the engine speed measurements, and being programmed to correlate variance in measurements of the air pressure from the maximum and minimum air pressure norms for the storage tank, variance normalized for engine speed in duration of charging time for the storage tank from the duty cycle norm, and variance in frequency of charging of the storage tank from the cycle interval norm with at least a first potential or actual fault condition.

6. A compressed air supply system as defined in claim 5, the programming of the body computer further comprising:

logic tables for indicating, a potential compressor problem if measured duty cycles exceed duty cycle norms but there is no concurrent increase in frequency in compressor operation, a governor problem if, compared with the respective norms, any of the following occur, measured cut in pressure is too low, if measured cut in pressure is too high, cut out pressure is too low, or cut out pressure is too high, a problem with the mechanical linkage between the engine and the compressor if duty cycles exceed duty cycle norms and none of the following are true, measured air tank pressure never hits its desired maximum, the brake pedal up leak rate has risen against its norm and pedal down pressure has risen against its norm, a leak ahead of the storage tank if duty cycle intervals have decreased and either of the following is true, measured storage tank pressure never reaches its desired maximum air pressure norm or duty cycle intervals have increased, a leak at the storage tank if duty cycle intervals have decreased and duty cycle times have increased and either of one of the following two conditions obtain, the pedal up leak rate has increased or the pedal down leak rate has increased, a leak after the storage tank if duty cycle intervals have decreased and the pedal down leak rate has increased without occurrence of an increase in duty cycle time and an increase in the pedal up leak rate, and water in the storage tank if duty cycle times decrease.

7. A compressed air supply system as defined in claim 6, further comprising:

logic which indicates, unmetered air use if duty cycle frequency increases without an increase in duty cycle time.

* * * * *